Dec. 5, 1950
H. G. MILLER
2,532,931
COMBINED CHRISTMAS TREE HOLDER
AND TREE WATERING PAN
Filed Dec. 19, 1946
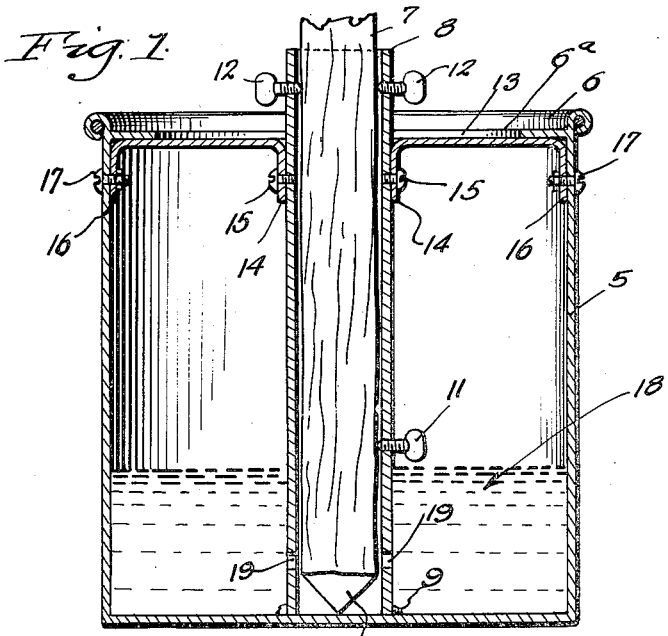
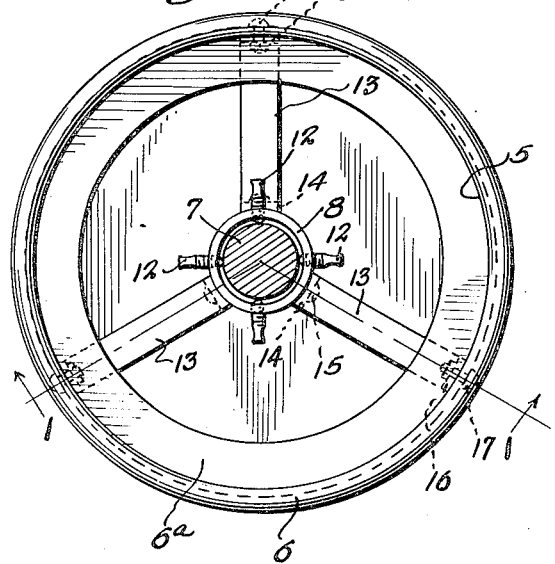
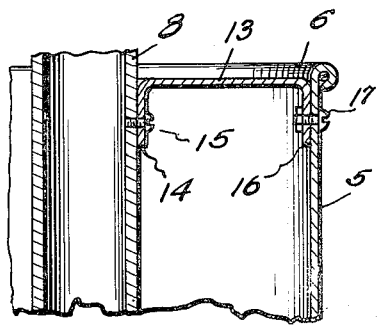
Inventor
HAROLD G. MILLER
By *Clarence A. O'Brien and Harvey B. Jacobson*
Attorneys Patented Dec. 5, 1950

2,532,931

UNITED STATES PATENT OFFICE 2,532,931

COMBINED CHRISTMAS TREE HOLDER AND TREE WATERING PAN

Harold G. Miller, Dover, Ohio

Application December 19, 1946, Serial No. 717,227

2 Claims. (Cl. 248—44)

1

The present invention relates to novel and useful improvements in Christmas tree holders and has more particular reference to one which embodies a water containing can or pan in conjunction with a properly arranged and suitably coacting tree holder.

Briefly, and somewhat more explicitly, the invention has to do with a can which is adapted to contain water or wet sand, said can being substantially open at its top and having arranged centrally therein a perpendicularly positioned tubular member, the tubular member being fastened at its lower end to the bottom of the can and projecting above the top of the can and constituting a tree trunk socket, means being provided to stabilize the parts and securely fasten the trunk of the tree in place.

An object of the invention is to provide a simple and expedient combination tree holder and can in which the tree may be securely anchored and constantly watered to keep it substantially fresh as long as possible.

Another object of the invention is to generally and otherwise improve upon, structurally and functionally, devices in the same general category, this in a manner to reduce the number of elements and parts entering into the complete structural combination, thereby not only increasing the efficiency of the structure as a whole but rendering same economical and otherwise possessed of factors of requisite simplicity, stability and durability.

Other objects, features and advantages will become more readily apparent in the following description and the accompanying illustrative drawings.

In the drawings, wherein like numerals are employed to designate like parts throughout the same:

Figure 1 is a vertical sectional view through a combination tree holder and tree watering can constructed in accordance with the principles of the present invention, the section being on 1—1 of Figure 2.

Figure 2 is a top plan view of the same.

Figure 3 is a fragmentary sectional view showing a slight modification in the constructional details.

Referring now to the drawings by distinguishing reference numerals it will be seen that the can or pan proper is denoted by the numeral 5, the same being vertically elongated and cylindrical in cross section and of appropriate material and capacity. The upper end is beaded at 6 and open except for a relatively narrow inturned flange 6ª. The trunk of the tree 7 fits telescopically and removably into a tubular member 8 and said tubular member is arranged concentrically in the can and has its lower end welded or otherwise secured thereto, as at 9. The tree trunk extends down to the bottom of the parts where the pointed end 10 thereof sits on the bottom of the can. The tree is held in place by thumb-screws, there being a series of said screws 11 mounted in the lower portion of the socket or tube 8 and another set of screws 12 arranged in the upper end of the socket at a point above the top of the can. It is believed that these screws 11 and 12, collectively considered, serve to securely anchor the tree trunk in the socket.

In addition to the above and for assured strength and durability I provide stay arms 13. These have their inner ends bent down as at 14 and screwed or otherwise fastened as at 15 to the socket. The outer downbent ends 16 are arranged just beneath the bottom of the flange 6 and are fastened to the can by screws 17. The stay arms in conjunction with the tubular hub serve to provide a spider-like assemblage of parts.

It is yet to be pointed out that, in practice, the can is charged with water 18 or wet sand (not shown) and the lower portion of the socket 8 is provided with apertures 19 permitting the tree trunk to be nourished by constant watering, this in an obvious manner.

The narrow marginal flange 6 resting on the stay arms or members 13 produces an effective and reliable structural assemblage of parts. Then, too, there is sufficient opening left in the top of the can to permit access to be had for assembling and securing parts together at the time of manufacture, or for purposes of repair at some later date. Then, and in addition, the use of the several stay arms provides an open hub arrangement which permits freedom of access for filling and empting the can and allows the user to have access to the thumb-screws 11, the ones which are on the interior of the can.

In Figure 3 the construction is the same as already described except that flange 6ª is omitted for simplicity.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A combination tree holder and water containing structure of the class described comprising a can substantially open at its top, a central, vertically disposed tubular member rigidly mounted in said can and providing a tree trunk receiving socket, said tubular member having its upper end extending to a plane above the open top of the can, that portion of the tubular member within the can and adjacent the bottom of the can being provided with water ports, a plurality of set screws mounted on and carried by said tubular member, certain of said set screws being within the confines of the can and the others on the upper end of the tubular member and at a point above the open top of the can, a plurality of radial stay-arms, the inner ends of said arms being downbent and detachably fastened at circumferentially spaced points to the upper intermediate portion of said tubular member, the outer end of said arms being likewise downbent and fastened removably to the upper wall portion of said can, said arms all being on a plane below the upper open top of the can whereby they are positioned within the confines of the can.

2. The structure specified in claim 1, together with a relatively narrow annular horizontally disposed flange having its outer peripheral edge fastened to the interior surface of said can just above the plane of the stay arms, the outer downbent ends of said stay arms contacting and underlying said flange.

HAROLD G. MILLER.

REFERENCES CITED

The following references are of record in the file of this patent:

UNITED STATES PATENTS

| Number | Name | Date |
|---|---|---|
| 1,124,780 | Miller et al. | Jan. 12, 1915 |
| 1,421,340 | Zelazo | June 27, 1922 |
| 1,873,693 | Whitfield et al. | Aug. 23, 1932 |
| 1,914,150 | Muldoon | June 13, 1933 |